United States Patent [19]
Hines

[11] 3,724,680
[45] Apr. 3, 1973

[54] REMOTE CONTROL SYSTEM FOR AUTOMATIC CAR UNCOUPLING DEVICE

[76] Inventor: Claude M. Hines, 111 Foxglove Lane, Columbia, S.C. 29210

[22] Filed: Dec. 16, 1970

[21] Appl. No.: 98,603

[52] U.S. Cl..................................................213/212
[51] Int. Cl............B61g 1/08, B61g 1/16, B61g 3/08
[58] Field of Search......................213/75 R, 211, 212

[56] References Cited

UNITED STATES PATENTS

| | | |
|---|---|---|
| 3,532,228 | 10/1970 | Beyer........................................213/212 |
| 2,290,476 | 7/1942 | Larsson..................................213/212 |
| 2,746,615 | 5/1956 | Heimaster et al. ....................213/212 |
| 3,280,990 | 10/1966 | Jeffrey et al...........................213/212 |
| 3,599,803 | 8/1971 | Cope......................................213/212 |

Primary Examiner—Drayton E. Hoffman
Attorney—Ralph W. McIntire, Jr.

[57] ABSTRACT

An electrical scheme utilizing circuitry including relays and contacts thereof selectively energized under the control of stepping switches to individually energize solenoid valves throughout a train to perform localized control functions such as car uncoupling operations.

3 Claims, 1 Drawing Figure

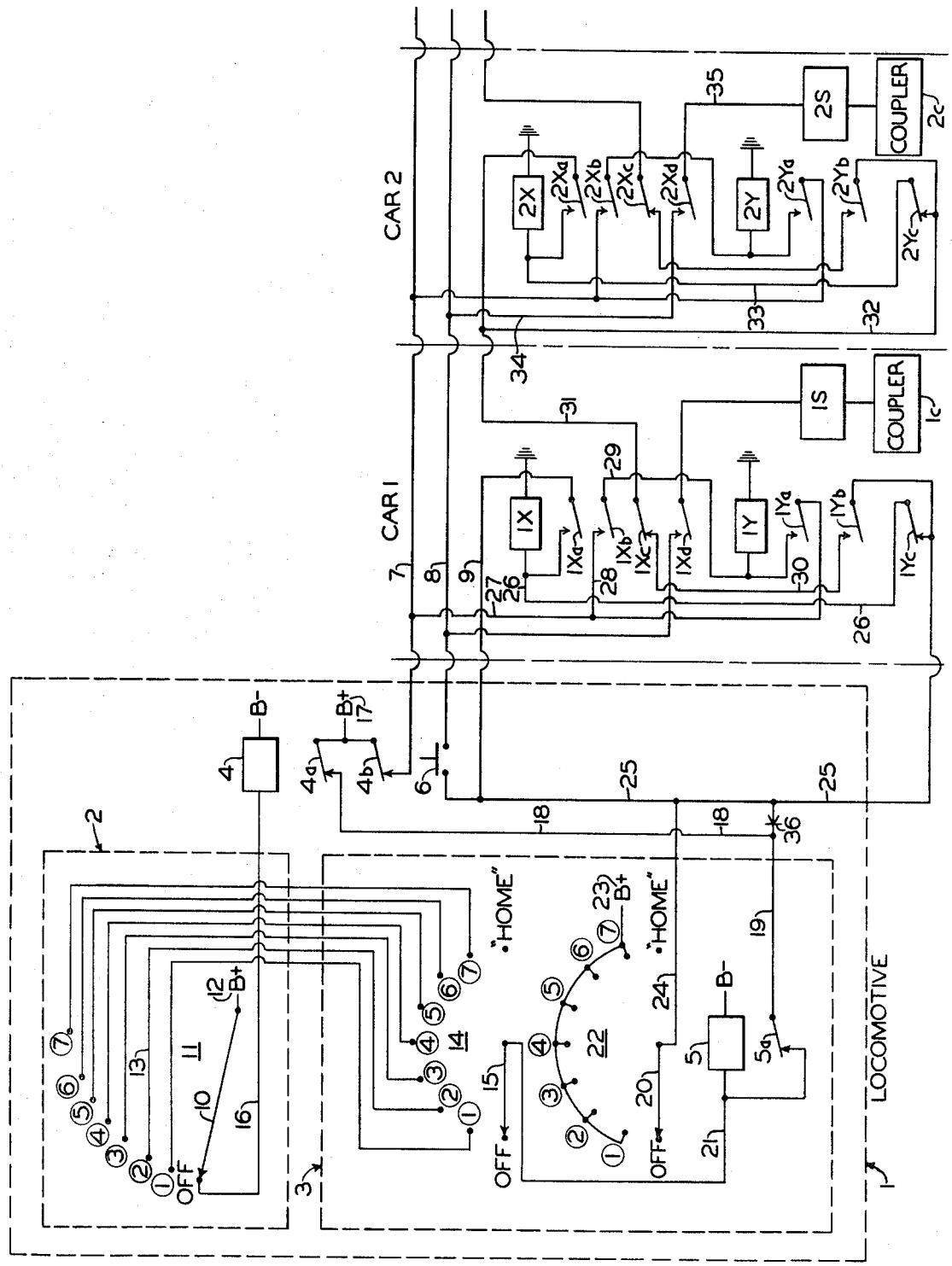
INVENTOR.
CLAUDE M. HINES
BY Ralph W. McIntire, Jr
ATTORNEY

REMOTE CONTROL SYSTEM FOR AUTOMATIC CAR UNCOUPLING DEVICE

BACKGROUND OF INVENTION

It has been desirous in passenger or freight trains and more so in transit trains utilizing automatic couplers, to have a control means in the operator's cab for automatically uncoupling a remote car or string of cars selectively by electrical circuitry to solenoid valves located throughout the train.

SUMMARY OF INVENTION

According to the present invention there is provided an electrical scheme including locomotive control for remotely performing a control function such as automatic uncoupling of selective cars throughout a railway train by utilizing novel train line circuitry including cooperatively operative stepping switches, relays and solenoid valves.

Referring to the drawing there is shown a diagrammatic view of the automatic car uncoupling system with the necessary circuitry and included switches interconnecting the component relays and solenoid valves of the system.

DESCRIPTION

In the drawing there is shown the circuitry utilized on the locomotive and two cars of a train. The locomotive circuitry is enclosed in a dotted box, and the car 1 and car 2 circuitry is shown between the respective broken lines separating the labelled car 1 and car 2. Additional cars may be included and would comprise similar circuitry as shown on car 1 and car 2, but for simplicity of description only two car circuitry is shown herein.

The locomotive equipment and circuitry 1 includes a selector switch 2 and a stepping switch apparatus 3 enclosed in separate dotted outline boxes, relays 4 and 5, and a manually operated switch 6.

The car equipment and circuitry includes a plurality of relays 1X, 1Y unlatching solenoid 1S associated with a coupler 1C on a car 1 and similarly relays 2X, 2Y unlatching solenoid 2S associated with a coupler 2C on car 2. The cars are interconnected by train wires 7, 8 and 9 in addition to the normal pneumatic or electric train lines (not shown) for effecting various braking and control functions.

The stepping switch 3 is of the rotary self-interrupting type having dual banks of contacts sequentially engaged by separate contact or wiper arms both driven together through a well-known rachet and pawl drive (not shown) in response to self-interrupting pulses to the relay 5 when the selector switch 2 is not in its OFF position as explained in detail hereinafter.

OPERATION

In operation, if it is desired to uncouple a car for example, car 2, the manually positioned arm 10 of selector switch 2 is moved to the number two contact button position on the selector switch bank 11. In the number two position, the arm 10 completes circuitry from the B+ supply 12 to provide a signal or potential via wire 13 to the number two contact button on switch bank 14 of stepping switch 3. This signal or potential at number two button of bank 14 is of consequence only when the arm 15 of bank 14 is engaging said button in manner explained herein.

When the arm 10 of selector switch 2 is moved out of engagement with the OFF button, the circuit including B+ supply 12, arm 10 and wire 16 for energizing relay 4 is interrupted to cause said relay 4 to drop-out. With relays 4 dropped out, contacts 4a and 4b thereof are closed. With contact 4b closed, circuitry is completed from B+ supply 17 to a train wire 7 extending throughout the entire length of the train to provide a source of electrical potential to each car. With contact 4a closed, circuitry is established via wires 18 and 19 to a normally closed contact 5a of relay 5 and thence via wire 21 to the relay 5 and ground B−. This just described circuitry causes the relay 5 to be energized to open contact 5a thereof, to in turn deenergize relay 5 to close contact 5a such that the relay is intermittently energized in a pulsing manner. The aforementioned well-known rachet and pawl mechanism (not shown) is operated responsively to the pulsing action of relay 5 to cause the arms 15 and 20 of the respective switch banks 14 and 22 of switch 3 to be sequentially stepped in synchronization between their respective contact buttons. The duration of pulses determined by inherent characteristics of relay 5 determines the rate at which the stepping switch 3 is stepped.

With wiper arm 20 of the switch bank 22 stepped to the number one contact button thereof, circuitry is completed from a B+ source 23 via the bank 22 to the number one button, arm 20, wire 24, wire 25, closed contact 1Yc of relay 1Y on car 1, wire 26 relay 1X and thence to ground, to thereby energize relay 1X and effect closing of contacts 1Xa, 1Xb, 1Xd and opening of contact 1Xc. With closing of contact 1Xa, a latching circuit is completed from B+ source 23, bank 22, arm 20 wires 24 and 25, wire 9 contact 1Xa wire 26 and relay 1X to ground to thereby maintain relay 1X energized and picked-up. Simultaneously, circuitry is established from the B+ supply 17, contact 4b and train line 7 via wires 27 and 28, contact 1Xb, wire 29 and relay 1Y to ground to thereby energize and pick-up relay 1Y. With relay 1Y picked, the contact 1Ya thereof is closed to complete a latching circuit including wire 27 and contact 1Ya to maintain relay 1Y energized and picked-up. The initial energizing circuit for relay 1X via contact 1Yc is opened, however, the previously described latching circuit including contact 1Xa maintains said relay 1X energized and picked-up. Closure of contact 1Yb provides a signal or a source of potential to the contact 1Xc of relay 1X via wire 30, however, contact 1Xc is opened due to energization of relay 1X and such potential at contact 1Xc is of no consequence at this point of operation. It must be noted that all of the above described operation has taken place during the first pulsing operation of the relay 5.

On the second pulsing of the relay 5, the contact arm 20 of the switch bank 22 disengages from the number one contact button and moves into engagement with the number two contact button. Simultaneously the contact arm 15 of switch bank 14 disengages from its number one contact button and engages its number two contact button.

When the contact arm 20 disengages from its number one contact button, the previously described latching circuit for relay 1X is interrupted to cause relay 1X to deenergize and drop-out, thereby opening contact 1Xd to the car 1 latching solenoid 1S, and closing contact 1Xc. As contact arm 20 engages number two button, and with contact 1Xc closed and the relay 1Y picked-up, the aforementioned signal or potential to contact 1Xc is supplied from the B+ source 23, number two button, contact arm 20 wire 24, wire 25, contact 1Yb, wire 30, contact 1Xc and wire 31 to car 2. The signal or potential from wire 31 to car 2 is conveyed via wire 32 to a contact 2Yc and wire 33 to effect energizing and pick-up of relay 2X in a manner exactly as that described with the energization of relay 1X of car 1. The relay 2X is latched in and relay 2Y energized and latched in exactly as described in the circuitry for energizing relays 1X and 1Y on the first pulsing of relay 5, however, due to the number two button positioning of the manual arm 10 of the selector switch 11, a signal or potential is provided at the number two button of switch bank 14 of the stepping switch 3, said signal being supplied via the arm 15 and wire 21 to provide a steady energization to relay 5 to stop the pulsing thereof. With the relay 5 constantly energized, the stepping action of the arms 15 and 20 is stopped and the said arms maintained in the number two button position until the arm 10 of selector switch 11 is relocated to again effect stepping action of the switch 3. With the arms 15 and 20 maintained in their respective number two button positions, relay 1X is maintained deenergized and relays 1Y, 2X and 2Y are all maintained steadily energized and latched in by circuitry previously described. With the relay 2X energized steadily the contact 2Xd thereof is maintained closed such that manually closing of switch 6 completes circuitry including B+ supply 23 number two button on switch bank 22, arm 20, wires 24 and 25, closed switch 6, train wire 8 to wire 34 on car 2, closed contact 2Xd, and wire 35 to an unlatching solenoid 2S to thereby energize said solenoid 2S. Energization of solenoid 2S effects operation of coupler 2C in any well-known manner to thereby uncouple car 2 and trailing cars (not shown) as desired. This desired uncoupling is effected by positioning of arm 10 of selector switch 2 on the number two button and operating the manual switch 6 when the stepping action of switch 3 stops. It should be noted, that if the switch 6 is closed prematurely (i.e. before the stepping action of switch 3 is stopped), the resultant signal that might be supplied to any unlatching solenoid (i.e. 1S) would be of a very short duration due to the stepping action of contact arm 15 and would be ineffective to cause any uncoupling operation. If, however, the signal became of extended duration, suitable time delay means could readily be included in the circuitry to prevent undesired uncoupling operation.

In order to reset the apparatus following a selected uncoupling operation as just described, the manually operated contact arm 10 of selector switch 2 is moved to its OFF button position on the switch bank 11. In its OFF position the B+ supply 12 is removed from any of the numbered buttons 1 through 7 such that no signal or potential is supplied to the switch bank 14 of selector switch 3, thereby nullifying any stopping action of switch 3 as would be effected by supplying a steady signal from said switch bank 15 to the pulsing relay 5. Movement of arm 10 to its OFF position, completes circuitry including B+ supply 12, arm 10, wire 16 and relay 4 to B− to energize and pick-up relay 4, thereby opening contacts 4a and 4b thereof.

Opening of contact 4b removes the potential from the train line 7 which in turn effects deenergization of the latching circuits for relays 1Y and 2Y to cause drop-out of said relays. Drop-out of relay 1Y and opening of contact 1Yb thereof effects drop-out of the relay 2X by deenergizing the latching circuit for said relay.

Opening of contact 4a removes the B+ supply 17 from wires 18 and the contact 5a of relay 5 which would appear to end the pulsing of relay, however, it is desirous to continue the pulsing of relay until the arms 15 and 20 on the switch banks 14 and 22 have reached their respective "homing" positions labelled HOME. In order to continue stepping the switch 3, an alternate circuit is provided, said circuit including B+ supply 23 the switch bank 22, arm 20, wire 24, wire 25, diode 36, and wire 19 to contact 5a and relay 5. The stepping action of switch 3 thereby continues until the contact arms 15 and 20 reach their respective non-energized HOME positions at which point the contact arms 15 and 20 are automatically returned to their respective OFF positions by mechanism (not shown) well-known in the stepping switch art. After the described "homing" action of switch 3 is completed with the switch 2 in OFF position the apparatus is then reset for any subsequent selection of an uncoupling operation by positioning of the selector switch 2, waiting for completion of the stepping operation of switch 3, and operation of manual switch 6.

Having now described the invention what I claim as new and desire to secure by Letters Patent, is:

1. A control apparatus comprising electric circuit means for remotely controlling operation of selected uncoupling means throughout a train of cars, said circuit means including:
   a. a selector switch for selectively energizing one of a plurality of selection circuits in accordance with a desired operation of a selected uncoupling means,
   b. a pulsating voltage supplying means operable responsively to initiation of energization of said one of said selection circuits to supply a pulsating voltage,
   c. first stepping switch means operable responsively to said pulsating voltage for sequentially establishing a plurality of individual control circuits corresponding respectively to said selection circuits and to the individual cars of the train,
   d. constant voltage supplying means conditionable responsively to establishment of said control circuits to provide a constant voltage supply,
   e. second stepping switch means operable responsively to said pulsating voltage supply when the selected one of said selection circuits is energized for establishing a stop circuit for cutting off supply of pulsating voltage to said first stepping switch means for retaining the one control circuit corresponding to the selected one of said selection circuits, and
   f. a plurality of relay means respectively connected to each of said plurality of control circuits and remotely located on each car of the train, the one of said relay means connected to the retained control circuit being conditioned responsively to such retainment of the corresponding control circuit for rendering the uncoupling means on the respective car operable.

2. Control apparatus as defined in claim 1, further including manually operated switch means operatively conditioned by retainment of said one of said control circuits and said conditioning of said one of said plurality of relay means to establish an operating circuit to said selected corresponding one of said uncoupling means.

3. Control apparatus comprising electrical circuitry means for remotely controlling operation of selected uncoupling means throughout a train of cars, said circuit means including:
   a. a plurality of relay means carried respectively by each car for effecting an uncoupling operation of the uncoupling means on the respective car of the train,
   b. a relay means operating circuit,
   c. a plurality of connecting circuits each corresponding to one of said plurality of relay means and each of said connecting circuits being energizable to connect a selected respective one of said relay means to said relay means operating circuit,
   d. a selector switch operable to select any one of said relay means to be connected in said relay means operating circuit,
   e. stepping switch means responsive to operation of said selector switch means to sequentially energize said plurality of connecting circuits until the relay means selected by said selector means is connected in said relay means operating circuit,
   f. said relay means operating circuit including manually operable switch means.

* * * * *